(12) United States Patent
Haltiner, Jr.

(10) Patent No.: US 6,720,099 B1
(45) Date of Patent: Apr. 13, 2004

(54) FUEL CELL WASTE ENERGY RECOVERY COMBUSTOR

(75) Inventor: Karl Jacob Haltiner, Jr., Fairport, NY (US)

(73) Assignee: Delphi Technologies, Inc., Troy, MI (US)

(*) Notice: Subject to any disclaimer, the term of this patent is extended or adjusted under 35 U.S.C. 154(b) by 316 days.

(21) Appl. No.: 09/838,577

(22) Filed: Apr. 19, 2001

Related U.S. Application Data

(60) Provisional application No. 60/268,437, filed on Feb. 13, 2001, and provisional application No. 60/201,568, filed on May 1, 2000.

(51) Int. Cl.[7] .............................................. H01M 8/04
(52) U.S. Cl. ........................................ 429/26; 429/13
(58) Field of Search .............................. 429/12, 13, 17, 429/19, 22, 26

(56) References Cited

U.S. PATENT DOCUMENTS

2001/0004500 A1 * 6/2001 Grasso et al. .................. 429/13

* cited by examiner

Primary Examiner—Randy Gulakowski
Assistant Examiner—M. Wills
(74) Attorney, Agent, or Firm—Paul L. Marshall

(57) ABSTRACT

The waste energy recovery assembly for a fuel cell system comprises: a cathode exhaust passage in fluid communication with a mixing zone through a collection chamber; an anode exhaust passage in fluid communication with said mixing zone by way of an anode exhaust gas orifice disposed in a direction capable of forming an anode exhaust gas flow entering said mixing zone at an angle of about 45° to about 135° to a combined gas flow entering said mixing zone from said collection chamber; a thermal exchange structure in fluid communication with said mixing zone; and an exhaust gas passage in fluid communication with said thermal exchange structure.

26 Claims, 2 Drawing Sheets

FUEL CELL WASTE ENERGY RECOVERY COMBUSTOR

CROSS-REFERENCE TO RELATED APPLICATION

The present application claims the benefit of the filing date of U.S. Provisional Application No. 60/268,437, filed on Feb. 13, 2001 and U.S. Provisional Application No. 60/201,568, filed on May 1, 2000, which is incorporated herein by reference in its entirety.

BACKGROUND

A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A solid oxide fuel cell (SOFC) is constructed of solid-state materials, utilizing an ion conductive oxide ceramic as the electrolyte. The electrochemical cell in a SOFC is comprised of an anode and a cathode with an electrolyte disposed therebetween. The components of an electrochemical cell and a SOFC are rigid and extremely fragile since they are produced from brittle materials.

In a SOFC, a fuel flows to the anode where it is oxidized by oxygen ions from the electrolyte, producing electrons that are released to the external circuit, and mostly water and carbon dioxide that are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC stacks exhaust unused fuel and oxidant. This exhaust is utilized in a waste energy recovery unit as a source of chemical and thermal energy. The waste energy recovery unit is a device that converts chemical energy and thermal energy into input thermal energy. This is accomplished with heat exchangers. However, waste energy recovery units can be inefficient in recovering the waste energy, and allow emissions of undesirable gaseous compounds, due to incomplete reactions of the unused fuel and oxidant.

SUMMARY

The drawbacks and disadvantages of the prior art are overcome by a method and apparatus for a waste energy recovery assembly for a fuel cell system, which are disclosed. In one embodiment, the waste energy recovery assembly for a fuel cell system comprises: a cathode exhaust passage in fluid communication with a mixing zone through a collection chamber; an anode exhaust passage in fluid communication with said mixing zone by way of an anode exhaust gas orifice disposed in a direction capable of forming an anode exhaust gas flow entering said mixing zone at an angle of about 45° to about 135° to a combined gas flow entering said mixing zone from said collection chamber; a thermal exchange structure in fluid communication with said mixing zone; and an exhaust gas passage in fluid communication with said thermal exchange structure.

One embodiment of the method of using a waste energy recovery assembly for a fuel cell system comprises: supplying reformate and supply air to said waste energy recovery assembly; directing said supply air and said reformate through a thermal exchange structure in said waste energy recovery assembly, wherein said supply air is separated from said reformate; introducing cathode exhaust gas to a mixing zone; introducing anode exhaust gas to said mixing zone at an angle of about 45° to about 135° a combined gas flow direction to form composite gases; combusting said composite gases; and flowing said combusted composite gases through said thermal exchange structure in thermal communication with said reformate and said supply air.

The above described and other features are exemplified by the following figures and detailed description.

BRIEF DESCRIPTION OF THE DRAWINGS

Referring now to the figures, wherein like elements are numbered alike.

DETAILED DESCRIPTION

Although described in connection with a SOFC system, it is to be understood that the described waste energy recovery design can be employed with any type of fuel cell system such as a SOFC, proton-exchange membrane (PEM), phosphoric acid, molten carbonate, and the like.

Fuel cell systems generate electricity employing fuel cell stack(s), reformer(s), enclosure(s), supply air, waste energy recovery assembly(ies), fuel injector(s), and control valves, and the like. To generate electricity, fuel and oxidant are introduced to the fuel cell stack. The gases that exhaust from the fuel cell stack include some percentage of unused combustible fuel gas (reformate), as well as oxidant and usable thermal energy. These unused hot gases can be routed to the waste energy recovery assembly to consume the unused fuel and to utilize the chemical and thermal energy to pre-heat new fuel and air before entering the fuel cell stack.

Within the waste energy recovery assembly, thoroughly mixing the hot gases in close proximity to a catalyst treated heat exchanger improves the process of consuming the unused fuel. The combusted gases remain relatively hot when they contact the catalyst, thereby increasing the effectiveness of the catalyst, particularly during cold start-up the fuel cell system.

During operation of a fuel cell system, the fuel cell stack is supplied with fuel and air. Although a direct supply of hydrogen, carbon monoxide, or methane is preferred, concentrated supplies of these fuels are generally expensive and not readily available. Therefore, the fuel (i.e., a more complex fuel source such as hydrocarbon fuels and the like) is first processed in a reformer (or series of reformers) to produce a reformate comprising hydrogen, carbon monoxide, methane, and the like. Consequently, preparing fuel for use in the fuel cell system can comprise introducing fuel and air to a reformer at certain ratios and temperatures to enable catalytic reactions to form the reformate.

Since the fuel cell stack operates at substantially higher temperatures than the reformer, prior to introducing the reformate and/or air to the fuel cell stack, the reformate and oxidant (e.g., air, or the like) are preferably heated by directing the reformate and air through a waste energy recovery assembly. Once heated, the reformate is directed to the anode side of the fuel cell, while the heated oxidant is directed to the cathode side of the fuel cell. Within the fuel cell, the fuel and oxidant react at electrodes to produce electricity and by-products. From the fuel cell stack, the anode exhaust (e.g., unused reformate and by-products (water, carbon dioxide, and the like)), and the cathode exhaust can be routed to the waste energy recovery assembly. Within the waste energy recovery assembly, the cathode and anode exhausts are intimately mixed. The unused reformate in the mixed stream is combusted to produce additional thermal energy that further heats the incoming reformate and oxidant.

Figure 1:
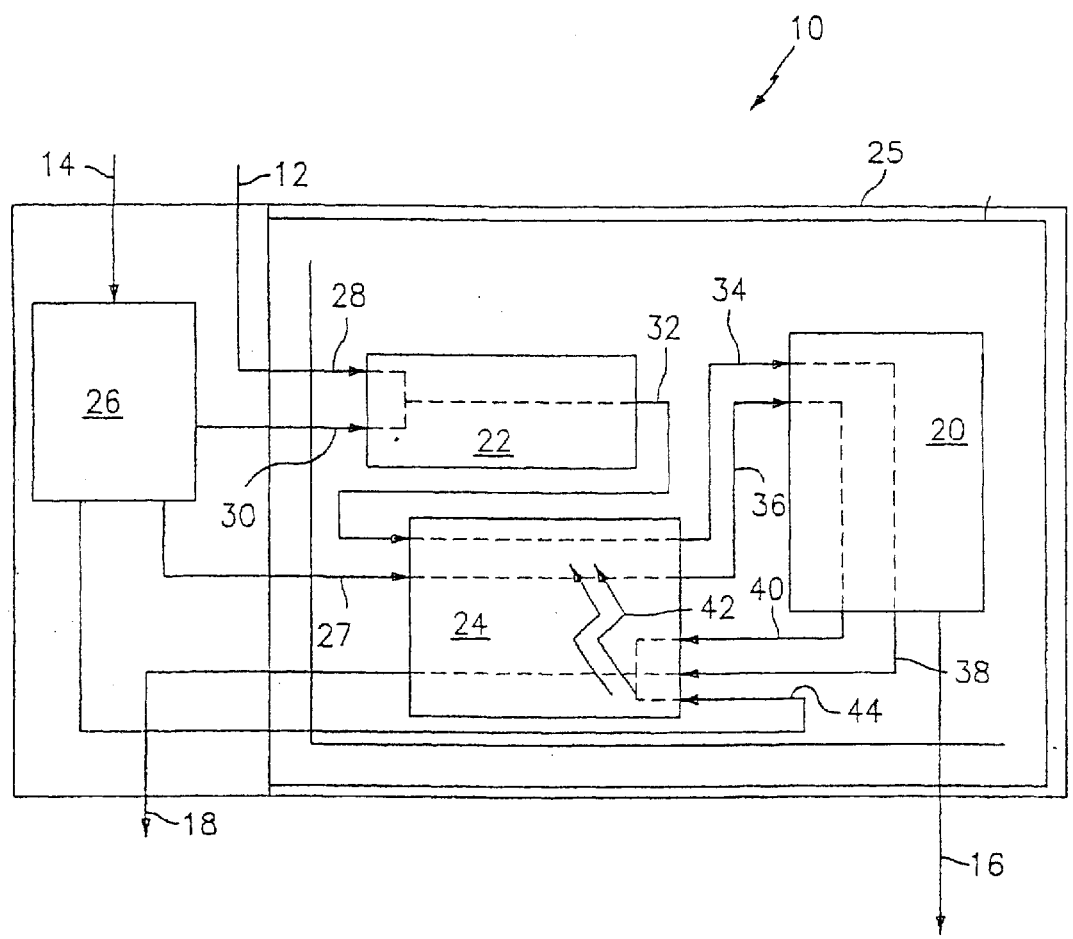
FIG. 1 is a schematic of an exemplary fuel cell system.

Referring now to FIG. 1, a mechanization of a fuel cell system 10 is schematically depicted. The fuel cell system 10 has inputs of fuel 12 and air 14 and outputs of electrical power 16 and exhaust 18. The fuel cell system 10 comprises a thermal management enclosure (e.g., "hot box") 25 disposed around a fuel cell stack 20, a fuel reformer 22, and a waste energy recovery assembly 24 (or heat exchanger). The fuel cell system 10 further comprises a process air supply 26 that can distribute the air 14 throughout the fuel cell system to meet various process air supply needs.

Located within the thermal management enclosure 25 and optionally thermally isolated from the fuel cell stack 20 (e.g., a segmented thermal management enclosure, isolated enclosure, or the like), is the reformer system (or reformer) 22 that comprises a main reformer, and optionally, a microreformer (not shown). The processing or reforming of hydrocarbon fuels, such as gasoline, in a reformer system 22 is completed to provide fuel source for the fuel cell stack 20 as well as protecting the fuel cell stack 20 by removing impurities. Fuel reforming can be used to convert a hydrocarbon (such as gasoline) or an oxygenated fuel (such as methanol) into hydrogen and byproducts (e.g., carbon monoxide, carbon dioxide, and water). Common approaches include steam reforming, partial oxidation, and dry reforming, and the like.

The reformer 22 is provided with fuel 12 through a fuel inlet 28, and air (or oxidant) 14 through air inlet 30 from process air supply 26. For some embodiments, a water supply (not shown) is also provided. The fuel reformer 22 produces a supply of reformate 32. From the reformer 22, all or a portion of the reformate 32 can be directed to the waste energy recovery assembly 24 to be heated prior to entering the fuel cell stack 20.

The reformate 32 produced in reformer 22 is used to provide fuel to fuel cell stack 20, which is in fluid communication therewith. The fuel cell stack 20, which may comprise a plurality of modular fuel cell stacks, comprises electrochemical cells comprising an anode and a cathode with an electrolyte disposed therebetween. Although the fuel cell stack 20 can receive all or part of the reformate directly from reformer 22, heated reformate 34 and heated air 36 are preferably directed to the fuel cell stack 20 to create electrical power 16 and byproducts which exit the fuel cell stack as anode and cathode exhaust gas 38,40. Since the anode exhaust gas 38 comprises thermal energy 42 and unreacted reformate, and the cathode exhaust gas 40 comprises thermal energy 42 and oxidant, thermal energy 42 can be recovered in the waste energy recovery assembly 24 and transferred to heat the reformate 32 and supply air 27.

Figure 2:
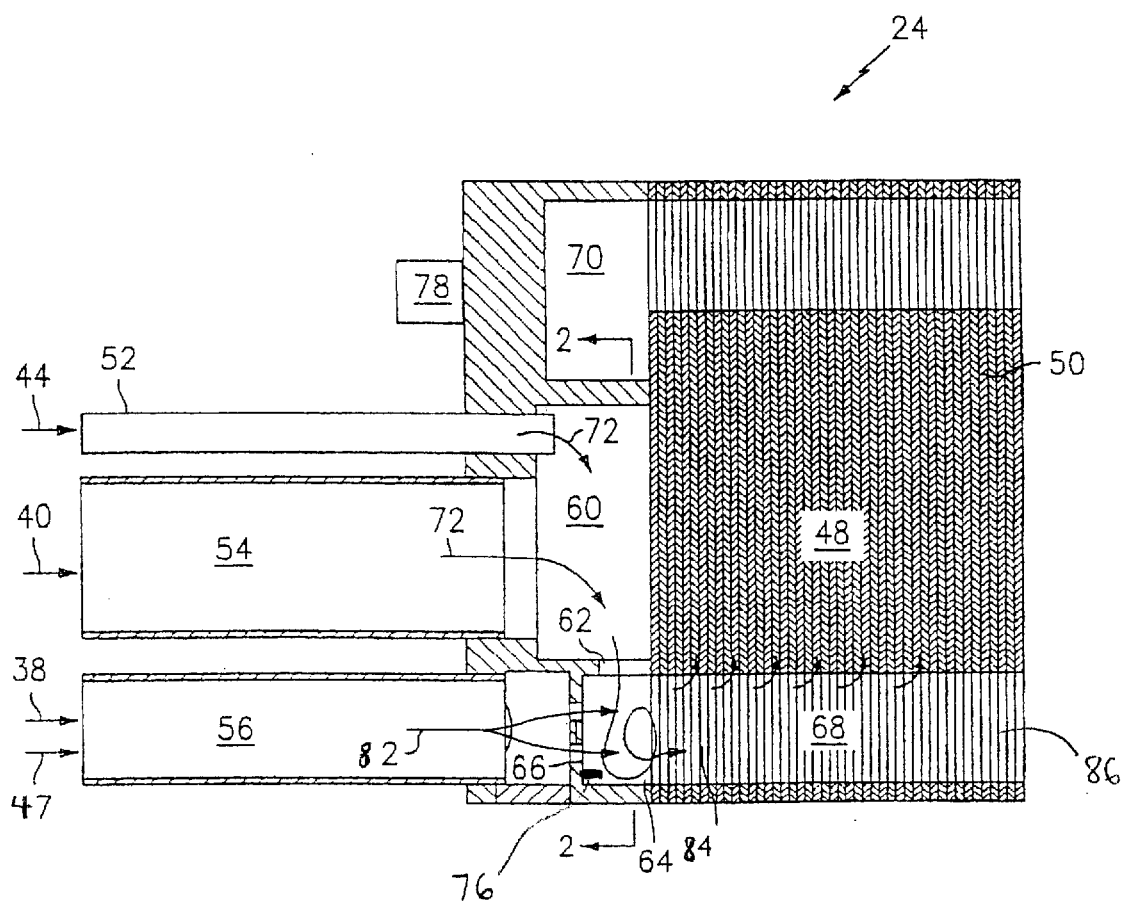
FIG. 2 is a side sectional view of an exemplary waste energy recovery assembly.
Figure 3:
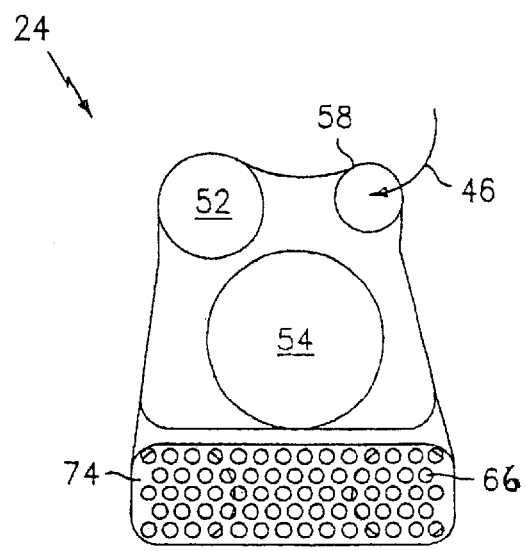
FIG. 3 is a sectional view through section 2—2 from FIG. 2 of an exemplary waste energy recovery assembly.

Referring to FIGS. 1, 2 and 3, the waste energy recovery assembly 24, which is located within the enclosure 25, transfers thermal energy 42 from the anode exhaust gas 38 and cathode exhaust gas 40 to the incoming supply air (oxidant) 27 and reformate 32. Within the waste energy recovery assembly 24, unreacted reformate and unused oxidant react and/or are burned to produce additional thermal energy and to remove excess reformate from the exhaust stream 18. In order to thermally regulate the waste energy recovery assembly 24, additional (fresh) reformate 47, as well as cooling air 44 and/or purge air 46 may also be introduced with the anode exhaust gas 38 and cathode exhaust gas 40.

The waste energy recovery assembly 24 comprises a plurality of fluid passages, flow orifices, thermal exchange portion(s) coated with catalytic materials, and a combustion chamber. The fluid passages can be inlets and exhaust passages that direct the gases into and out of the waste energy recovery assembly. The passages can be gas inlets that direct the gases into chambers so that the gases can be intimately mixed and combusted proximate to the thermal exchange portion(s). The exhaust passages can direct the gases out of the waste energy recovery assembly to atmosphere. The flow orifices can be arranged such that the gases are accelerated and directed to mix with other gases in a thorough manner such that more complete combustion occurs. The combustion chamber can be arranged proximate the orifices and configured to promote the thorough mixing and combustion of the gases proximate to the thermal exchange portions such that catalytic reactions can occur.

The waste energy recovery unit comprises a cooling air passage 52, a cathode exhaust gas passage 54, an optional purge air passage 58 and an anode exhaust gas passage 56, all in fluid communication with a combustion chamber or mixing zone 64. (Although not preferred, it should be noted that the passages as illustrated in FIGS. 2 and 3 are interchangeable. In other words, the anode exhaust gas passage can be gas passage 54, with the other gas passages disposed in place of passage 56 such that the purge air, cooling air, and cathode exhaust gas will pass through orifices to enter the mixing zone 64.) The cooling air passage 52 and cathode exhaust passage 54 are further in fluid communication with the mixing zone 64 via one or more collection chamber orifices 62 as shown by flow direction arrows 72. Another orifice or plurality of orifices known as anode exhaust gas orifices 66 are disposed between the anode exhaust gas passage 56 and the mixing zone 64. Proximate to the mixing zone 64 can be a manifold 68 in fluid communication with an exhaust passage 70 via the thermal exchange portions or thermal exchange structures 48 which preferably comprise a catalyst 50 coating disposed thereon. A catalyst 50 material is disposed on the thermal exchange structures 48.

As illustrate in FIGS. 2 and 3 in an exemplary embodiment, the waste energy recovery assembly 24 comprises passages 52, 54, 56, 58, each of which can comprise one or more conduits, orifices, manifolds and chambers (or zones) that control the flow, and mix the gases. The cooling air passage 52, the cathode exhaust passage 54, and the purge air passage 58 are all in fluid communication with a collection chamber 60 that is in fluid communication with the mixing chamber 64 via one or more collection chamber orifice(s) 62. The collection chamber 60 can be any area that allows a combined gas 80 (e.g., cooling air, purge air, and cathode exhaust gases) to mix prior to passing into the mixing zone 64 through collection chamber orifice 62.

The collection chamber orifice 62, which can be a narrowing of flow area at an outlet from the collection chamber 60, preferably comprises a sufficient size and geometry to induce turbulence in the combined gas 80 flow when it enters the mixing chamber 64. The narrowing flow area increases the velocity of the flowing gases as the gases exit the collection chamber 60. The high velocity flow creates a pressure drop across the collection chamber orifice 62. The configuration of the collection chamber orifice(s) 62 can be of various shapes (e.g., a slot, circle, multi-sided opening, and the like), and sizes to, in combination with the direction of flow and geometry of the mixing zone 64, induce sufficient turbulence within the mixing zone to obtain substantially uniform mixing of the combined gas 80 flow with the anode exhaust gas 38. To further induce the turbulence, which is preferably a swirl and tumble turbulence, the combined gas flow 80 is preferably disposed at an angle of about 45° to about 135° to a flow direction 82, with the combined gas 80 flow being disposed perpendicular to the flow direction 82 preferred. In one embodiment, the collection chamber orifice 62 can be a slot that extends along the width of the collection chamber wall adjacent the mixing zone 64. The slot is preferably narrow but has a long length (e.g., has a length of up to about 5 times (or more) of its width, with a length of greater than about 10 times its width preferred) and thus creating a sheet of high velocity combined gas flow. The combined gas flow rate can be up to about 100 meters per second (m/s) or so, with about 30 m/s to about 60 m/s preferred.

The flow direction 82 is preferably established with the gas, e.g., the anode exhaust gas, entering the mixing chamber 64 through anode exhaust gas orifices 66. The anode exhaust gas orifices 66 establish fluid communication between the anode exhaust gas passage 56 and the mixing chamber 64. Preferably, the anode exhaust gas orifices 66 comprise a sufficient diameter and number to achieve a homogenous mixture with combined gas flow 80. Anode exhaust gas orifices 66, which preferably produce several jets of anode exhaust gas in the flow direction 82, can be any configuration (or shape) of flow area or areas that reduce the flow area of the anode exhaust gas 38 such that the anode exhaust gas 38, as it passes through the anode exhaust gas orifices 66, increases velocity. The size, configuration, and number of anode exhaust gas orifices 66 and resultant flow characteristics can vary depending upon the volume and velocity of gases to be directed through the waste energy recovery assembly 24 and the efficiency of the fuel cell stack 20, as well as other factors such as environmental conditions, and the like. In one embodiment, the velocity can be up to about 100 m/s, with about 20 m/s to about 30 m/s preferred.

For example, in one embodiment, the anode exhaust gas orifices 66 can be circular holes (or bores) thru a plate shaped member 74, arranged in a pattern that directs the anode exhaust gas 38 into the mixing zone 64 at an angle substantially perpendicular to the flow direction through collection chamber orifice 62. For example, in the example shown in FIGS. 2 and 3, the anode exhaust gas will pass from two passages 56 through sixty-six anode exhaust gas orifices 66 into the mixing chamber 64. The actual number of passages and orifices is dependent upon the volume of gas to be received by the waste energy recovery assembly 24, the desired velocity through the orifices, and the number and size that are practical for manufacturing purposes.

After passing through anode exhaust gas orifices 66 and collection chamber orifice 62, composite gas 84 (i.e., anode exhaust gas, cathode exhaust gas and the like) mix in the mixing zone 64 prior to entering manifold 68. The mixing zone 64 preferably has any size and geometry that further induces mixing of the gases, promotes combustion of the anode exhaust gas 38 with the combined gases 80, and distributes the composite gases 84 to the manifold 68. As is illustrated in FIG. 2, the mixing zone 64 can have a rectangular or oblong geometry with the major axis disposed perpendicular to the flow of the gases through gas orifices 66. With respect to location, since the mixing zone 64 is disposed adjacent to the catalyst coated thermal exchange portion 48, the combustion heat produced can further enhance the efficiency of the catalyst 50.

Movement of the composite gases 84, from the mixing zone 64 to the thermal exchange structure 48 is obtained via the manifold 68, which is disposed between and in fluid communication therewith. The manifold 68 which preferably further promotes reactions of the composite gases 84, can distribute the gases into the multiple channels of the thermal exchange structure 48.

A combustion plug (e.g., glow plug, spark plug, or the like) 76 can optionally be employed to promote ignition and combust the composite gases 84 that are present in the mixing zone 64 and the manifold 68. During cold start-up sequences, the mixing zone 64 and manifold 68 and incoming gases may be at temperatures that are below the ignition temperatures for the composite gases 84 to be combusted. The combustion plug 76 can be employed to initiate combustion until the mixing zone 64 and manifold 68, and/or the incoming gases, attain a sufficient temperature to maintain self-sustaining combustion.

The thermal exchange structures 48, which are in communication with the composite gases 84, reformate 32, and supply air 27, can comprise any heat transfer structure capable of withstanding the fuel cell system operating temperatures (e.g., up to about 1,000° C.) and can be exposed the various system gases (fuel, air, and byproducts). For example, the thermal exchange structure 48 can comprise plate(s), tubes(s), conduit(s), fin(s) coil(s), and the like, as well as combinations comprising at least one of the foregoing structures.

In order to enhance the thermal transfer and ensure complete removal of the reformate from the gas stream, the thermal exchange structures 48 preferably comprise the catalytic coatings over at least a portion and optionally all of the surface of the structure 48 to be exposed to the composite gases 84. The catalyst 50 coating can comprise any material capable of exothermically reacting reformate and oxidant, including tantalum, yttrium, cerium, nickel, copper, zirconium, nickel, platinum, rhodium, palladium, osmium, iridium, ruthenium, aluminum, titanium, chromium, and the like, as well as oxides, alloys, and combinations of at least one of the foregoing materials.

From the thermal exchange structures 48, the composite gas 84 exits the waste energy recovery assembly 24 via exhaust passage 70. The exhaust passage 70 can be a volume that directs the flow of the exhaust gases as well as optionally provides heat transfer to the waste energy recovery assembly 24. A plurality of exhaust passages 70 are also contemplated.

During operation of the fuel cell system 10, air 30 and fuel 12 enter the reformer 22 that produces reformate 32. The reformate 32 as well as oxidant 27 are directed to the waste energy recovery assembly 24 for thermal energy transfer. Meanwhile, anode exhaust gas 38, cathode exhaust gas 40, cooling air 44, optionally purge air 46, and optionally fresh reformate 47 enter from inlet passages (52, 54, 56, 58). The gases are injected through orifices (62, 66) into the mixing zone 64 to form the composite gases 84. In the mixing zone 64 and manifold 68, the composite gases 84 thoroughly mix and combust, optionally with the assistance of a combustion plug 76, and then flow through the thermal exchange structures 48 to react with the catalyst material 50, and to transfer thermal energy 42 from the composite gases 84 to the reformate 32 and supply air 27. The composite gases 84 issue from the thermal exchange structures 48 as exhaust 18 via exhaust passage 70.

The cooling air 44 can be employed to maintain the temperatures of the gases to be combusted. Combustion temperatures can impact the exhaust emissions from the fuel cell system, so the combustion temperatures are maintained to optimize combustion. If the gas is too cool, the gas is inefficient for transferring heat and keeping catalyst active. If the gas is too hot, metal parts can deform or melt and nitrogen oxides will form. Preferably, the temperature is sufficient to enable efficient thermal transfer and to maintain the catalyst activity without forming substantial amounts of nitrogen oxides or adversely effecting the structural integrity of the components. For example, the temperature can be range about 700° C. to about 2,000° C., with about 850° C. to about 1,200° C. preferred. The cooling air 44 flow rates can be controlled from data taken with sensors (not shown) in the waste energy recovery assembly 24 by a controller 78. The controller 78 can process the data and employ control commands based on gas flows to adjust the cooling air 44 flow rate into the collection chamber 60.

Once the reformate 32 and supply air 27 are heated they are directed to the fuel cell stack 20 that reacts the reformate and air to produce electricity 16. The exhaust streams from the fuel cell stack 20, and optionally fresh reformate 47, are directed to the waste energy recovery assembly 24.

The waste energy recovery assembly provides substantial combustion of waste gases (e.g., emissions of about 10 parts per million (ppm) or less for both hydrocarbons and carbon monoxide). The design of the waste energy recovery assembly provides for fewer parts, tubes and connections without experiencing significant pressure drops in the gas streams, while maintaining superior mixing and enhanced combustion. The orifices allow for the mixing of the gases, without excessive turbulence, resulting in more complete combustion and catalytic reactions. Additionally, more complete burning of the fuel and hot gases is desirable to produce cleaner emission from the fuel cell system. Operation of the fuel cell system employing the waste energy recovery assembly in this configuration can provide greater system efficiency.

A further advantage is that the high velocity and small pressure drop across the orifices within the waste energy recovery assembly prevent combustion in the supply tubes due to fuel in the oxidant or oxidant in the fuel. This would be undesirable due to uncontrolled combustion resulting in high emissions or damaged components.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplate for carrying out this invention, but that the invention will include all embodiments falling within the scope of the appended claims.

What is claimed is:

1. A waste energy recovery assembly for a fuel cell system, comprising:
   a cathode exhaust passage in fluid communication with a mixing zone through a collection chamber;
   an anode exhaust passage in fluid communication with said mixing zone by way of an anode exhaust gas orifice disposed in a direction capable of forming an anode exhaust gas flow entering said mixing zone at an angle of about 45° to about 135° to a combined gas flow entering said mixing zone from said collection chamber, said combined gas flow comprising cathode exhaust gas;
   a thermal exchange structure in fluid communication with said mixing zone; and
   an exhaust passage in fluid communication with said thermal exchange structure.

2. The assembly of claim 1, further comprising a cooling air passage in fluid communication with said collection chamber.

3. The assembly of claim 2, further comprising a purge air passage in fluid communication with said collection chamber.

4. The assembly of claim 3, further comprising a controller in operable communication with said purge air passage, said cooling air passage, and said mixing zone.

5. The assembly of claim 2, further comprising a controller in operable communication with said cooling air passage and said mixing zone.

6. The assembly of claim 1, wherein said thermal exchange structure further comprises catalyst material disposed on at least a portion of said thermal exchange structure.

7. The assembly of claim 1, further comprising a manifold in fluid communication with said mixing zone, manifold comprising a plurality of channels in fluid communication with said thermal exchange structure.

8. The assembly of claim 1, further comprising a combustion plug disposed in said mixing zone.

9. The assembly of claim 1, wherein said angle is sufficient to form a turbulence when anode exhaust gas and said combined gas flow are introduced to said mixing zone.

10. The assembly of claim 1, wherein said angle is perpendicular.

11. The assembly of claim 1, further comprising a collection chamber orifice, wherein said collection chamber orifice has a slot-like geometry.

12. The assembly of claim 1, wherein said collection chamber orifice has a length greater than about 5 times a width of said collection chamber orifice.

13. The assembly of claim 1, wherein said length is greater than about 10 times said width.

14. A method of using a waste energy recovery assembly for a fuel cell system, comprising:
   supplying reformate and supply air to said waste energy recovery assembly;
   directing said supply air and said reformate through a thermal exchange structure in said waste energy recovery assembly, wherein said supply air is separated from said reformate;
   introducing cathode exhaust gas to a mixing zone;
   introducing anode exhaust gas to said mixing zone at an angle of about 45° to about 135° a combined gas flow direction to form composite gases, wherein said combined gas flow comprises cathode exhaust gas;
   combusting said composite gases; and
   flowing said combusted composite gases through said thermal exchange structure in thermal communication with said reformate and said supply air.

15. The method of claim 14, further comprising catalytically reacting said anode exhaust gas and said cathode exhaust gas.

16. The method of claim 14, further comprising mixing said cathode exhaust gas with cooling air in a collection chamber to form said combined gas flow.

17. The method of claim 14, wherein said angle is sufficient to form a turbulence when anode exhaust gas and said combined gas flow are introduced to said mixing zone.

18. The method of claim 17, wherein said angle is perpendicular.

19. The method of claim 14, further comprising passing said combined gas flow through a collection chamber orifice, wherein said collection chamber orifice has a slot-like geometry.

20. The method of claim 19, wherein said collection chamber orifice has a length greater than about 5 times a width of said collection chamber orifice.

21. The method of claim 20, wherein said length is greater than about 10 times said width.

22. The method of claim 14, further comprising maintaining said waste energy recovery assembly at a desired temperature by mixing with said cathode air exhaust.

23. The method of claim 22, further comprising mixing a purge air with said cathode air and said cooling air to form said combined gas flow.

24. The method of claim 23, further comprising igniting said anode exhaust gas and said combined gas flow in said mixing zone.

25. A fuel cell waste energy recovery assembly comprising:
   a means for supplying reformate and supply air to said waste energy recovery assembly;
   a means for directing said supply air and said reformate through a thermal exchange structure in said waste energy recovery assembly, wherein said supply air is separated from said reformate;
   a means for introducing cathode exhaust gas to a mixing zone;
   a means for introducing anode exhaust gas to said mixing zone at an angle of about 45° to about 135° a combined gas flow direction to form composite gases, wherein said combined gas flow comprises cathode exhaust gas;
   a means for combusting said composite gases; and
   a means for flowing said combusted composite gases through said thermal exchange structure in thermal communication with said reformate and said supply air.

26. A waste energy recovery assembly for a fuel cell system, comprising:
   a cathode exhaust passage, cooling air passage and purge air passage in fluid communication with a collection chamber, said collection clamber in fluid communication with a mixing zone;
   an anode exhaust passage in fluid communication with said mixing zone by way of an anode exhaust gas orifice disposed in a direction capable of forming an anode exhaust gas flow entering said mixing zone at an angle of about 45° to about 135° to a combined gas flow entering said mixing zone from said collection chamber, said combined gas flow comprising cathode exhaust;
   an igniter in operable communication with said mixing zone;
   a thermal exchange structure in fluid communication with said mixing zone; and
   an exhaust gas passage in fluid communication with said thermal exchange structure.

* * * * *